US009053082B2

(12) United States Patent
Boutin

(10) Patent No.: US 9,053,082 B2
(45) Date of Patent: Jun. 9, 2015

(54) SPREADSHEET DATA PROCESSING METHOD AND SYSTEM

(75) Inventor: Samuel Boutin, Versailles (FR)

(73) Assignee: KNOWLEDGE INSIDE, Versailles (FR)

( * ) Notice: Subject to any disclaimer, the term of this patent is extended or adjusted under 35 U.S.C. 154(b) by 789 days.

(21) Appl. No.: 13/288,345

(22) Filed: Nov. 3, 2011

(65) Prior Publication Data

US 2013/0117648 A1    May 9, 2013

(51) Int. Cl.
*G06F 17/00* (2006.01)
*G06F 17/24* (2006.01)
*G06F 17/22* (2006.01)

(52) U.S. Cl.
CPC .......... *G06F 17/246* (2013.01); *G06F 17/2241* (2013.01)

(58) Field of Classification Search
CPC .......................... G06F 17/2241; G06F 17/246
USPC .................................................. 715/212, 215
See application file for complete search history.

(56) References Cited

U.S. PATENT DOCUMENTS

| | | | | |
|---|---|---|---|---|
| 5,603,021 A * | 2/1997 | Spencer et al. | ......................... | 1/1 |
| 7,461,077 B1 * | 12/2008 | Greenwood | ............................ | 1/1 |
| 7,702,998 B2 * | 4/2010 | Kotler et al. | .................... | 715/212 |
| 7,747,657 B2 * | 6/2010 | Singh | ............................ | 707/803 |
| 8,347,204 B2 * | 1/2013 | Rosner | .......................... | 715/227 |
| 2002/0138582 A1 * | 9/2002 | Chandra et al. | ............... | 709/206 |
| 2003/0056181 A1 * | 3/2003 | Marathe | .......................... | 715/538 |
| 2003/0177137 A1 * | 9/2003 | MacLeod et al. | ............. | 707/102 |
| 2005/0081141 A1 * | 4/2005 | Jonsson | ........................ | 715/503 |
| 2005/0183002 A1 * | 8/2005 | Chapus | ......................... | 715/505 |
| 2007/0162504 A1 * | 7/2007 | Chivukula et al. | ......... | 707/104.1 |
| 2008/0059625 A1 * | 3/2008 | Barnett et al. | ................ | 709/223 |
| 2008/0306983 A1 * | 12/2008 | Singh | ............................ | 707/102 |
| 2009/0024957 A1 * | 1/2009 | Ingman et al. | ................ | 715/788 |
| 2010/0057684 A1 | 3/2010 | Williamson | | |
| 2011/0072340 A1 * | 3/2011 | Miller et al. | .................. | 715/220 |

FOREIGN PATENT DOCUMENTS

WO        2010091456 A1       8/2010

OTHER PUBLICATIONS

Boutin, Samuel et al "How to turn spreadsheets into object oriented models", Nov. 6, 2012, Knowledge Inside, 11 page +1 index page http://www.k-inside.com/web/wp-content/uploads/2012/11/CSDM2012-KI-paper49.pdfhttp://www.k-inside.com/web/wp-content/uploads/2012/11/.*

(Continued)

*Primary Examiner* — Cesar Paula
*Assistant Examiner* — David Faber
(74) *Attorney, Agent, or Firm* — Young & Thompson

(57) ABSTRACT

A method carried out in a computer system having thereon a spreadsheet file with lines and columns, the columns representing fields and each line representing a record, the sheet also having a header portion with a designation line with a field designation for each column, wherein the method identifies a single reference field, allocates a field type to fields other than the reference field, defines a link for each field with a field type and thereby link with another linked field, builds a hierarchical model representing the links, and generates a graphical hierarchical multilevel representation of the sheet content, with graphical views showing one or more hierarchical levels and displaying this representation on a display.

14 Claims, 9 Drawing Sheets

Multi layer graphical representation

(56) References Cited

OTHER PUBLICATIONS

Javaid, Usman, "Create Organization Chart in Visio 2010 From Excel Spreadsheet", May 3, 2010, addictivetips, 8 pages http://www.addictivetips.com/microsoft-office/create-organization-chart-in-visio-2010-from-excel-spreadsheet/.*

GCF, "Excel 2010: Outlining Data", Apr. 2, 2011, GCF, 10 pages https://web.archive.org/web/20110402092051/http://www.gcflearnfree.org/excel2010/12/full.*

Bals et al, "ClassSheets—model-based, objectoriented design of spreadsheet applications", Oct. 2007, Journal of Object Technology, ETH Zurich, pp. 383-398.*

Engel et al, "ClassSheets: Automatic Generation of Spreadsheet Applications from Object-Oriented Specifications", Nov. 7-11, 2005, ASE 05, ACM, 10 pages.*

"Creating an Excel 2003 Spreadsheet using Windows 2000/Me/XP", Created Sep. 8, 2003, pp. 1-38.

* cited by examiner

Root

SPREADSHEET DATA PROCESSING METHOD AND SYSTEM

FIELD OF THE DISCLOSURE

The present invention concerns data processing methods and systems, in particular data processing methods and systems operating on a spreadsheet.

BACKGROUND OF THE DISCLOSURE

More precisely, the present invention concerns a method carried out in a computer system, said computer system comprising:
- a spreadsheet file having at least a sheet with lines and columns, wherein columns represent fields, said sheet having:
  - a header portion having at least a designation line with a field designation for each column,
  - a data portion, wherein each line comprises a record,
- a processing unit, a keyboard, a mouse, and a display unit.

Many users currently use a spreadsheet, such as Excel™ or the like, in order to manage a large quantity of structured information. Such large quantity of information often requires various updates.

Changes are carried out either by manual updates directly in the boxes of the spreadsheet, or by the use of so-called 'macros' operations, which can affect a complete area of the spreadsheet altogether. Furthermore, as known in the art, some graphical representation, like histograms or breakdowns can be issued from of a portion of the data, substantially for statistic purpose.

However, there is a need to improve the management of the data representation and data update using a graphical interface.

SUMMARY OF THE DISCLOSURE

To this end, the present invention discloses a method carried out in a computer system, said system computer comprising:
- a spreadsheet file having at least a sheet with lines and columns, wherein columns represent fields, said sheet having:
  - a header portion having at least a designation line with a field designation for each column,
  - a data portion, wherein each line comprises a record
- a processing unit, a keyboard, a mouse,
- a display unit, the method comprising:
/a/ identifying a single reference field,
/b/ an allocating step in which a field type is allocated to fields other than the reference field, said field type belonging to a set of field type comprising attribute, parent/child, and flow,
/c/ defining a link, for each field with an allocated type, which establishes a link with another linked field, within said sheet or another sheet, wherein:
  for a field type being attribute, said link is an attribute link and defines properties relative to the reference field or to a parent field,
  for a field type being parent/child, said link is an parent/child link and defines a membership relationship, wherein a child belongs to a parent field,
  for a field type being flow, said link is a flow link and defines a message relative to the reference field,
/d/ building a hierarchical model representing the parent/child links, defining at least two hierarchical levels, said model comprising all the fields involved in the parent/child links,
/e/ generating a graphical hierarchical multilevel representation of said sheet content, with at least one graphical view showing one or more hierarchical level and displaying said representation on the display unit.

Thanks to these dispositions, the graphical hierarchical multilevel representation allows the user to have a more comprehensive representation of the data contained in the spreadsheet. Further, as it will become apparent from the specification and the dependent claims, the user can update some information of the spreadsheet content directly on the graphical hierarchical multilevel representation.

In various embodiments of the invention, one may possibly have recourse in addition to one and/or the other of the following arrangements.

According to another aspect, the method may further comprise: /d2/ building a full model comprising all data contained in the data portion of the sheet according to the hierarchical model, wherein the graphical hierarchical multilevel representation is generated from said full model. Therefore, frequent access to the sheet can be avoided.

According to another aspect, said graphical hierarchical multilevel representation may comprise at least one view per hierarchical level which shows graphically a parent instance and all children linked to said parent instance by a parent/child link, and preferably the attributes of each child. Therefore, synthetic comprehensive views are provided to the user.

According to another aspect, said view per hierarchical level further shows graphically attribute fields linked to all children linked to said parent instance by a parent/child link, and/or flow fields linked to all children linked to said parent instance by a parent/child link. Thereby, a plurality of useful extensive views are provided to the user.

Other additional features are defined in further dependent claims.

BRIEF DESCRIPTION OF THE DRAWINGS

Other features and advantages of the invention appear from the following detailed description of one of its embodiments, given by way of non-limiting example, and with reference to the accompanying drawings.

In the drawings:

FIG. 3 is a first example of spreadsheet used in the invention, FIG. 3B is a variant of the example of FIG. 3, FIGS. 4A-4G are exemplary views of a graphical representation corresponding to the spreadsheet of FIG. 3, FIG. 6 is another a second example of a spreadsheet used in the invention.

MORE DETAILED DESCRIPTION OF THE DISCLOSURE

In the figures, the same references denote identical or similar elements.

Figure 1:
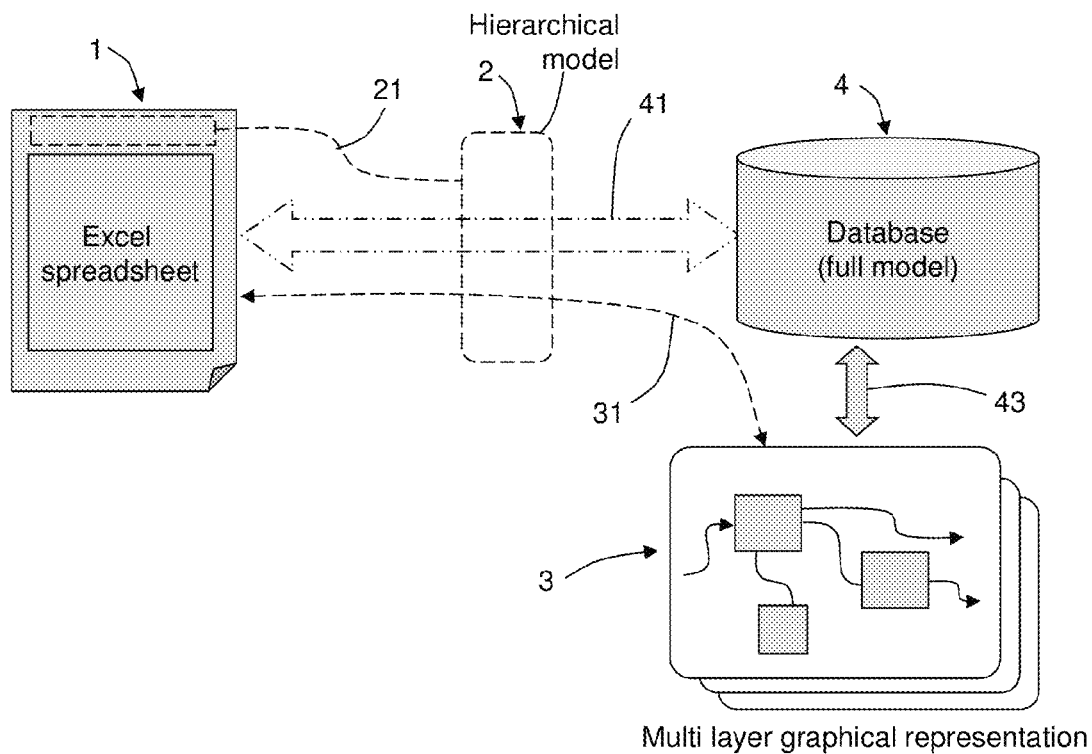
FIG. 1 is a schematic view of the method carried out in the invention.
Figure 2:
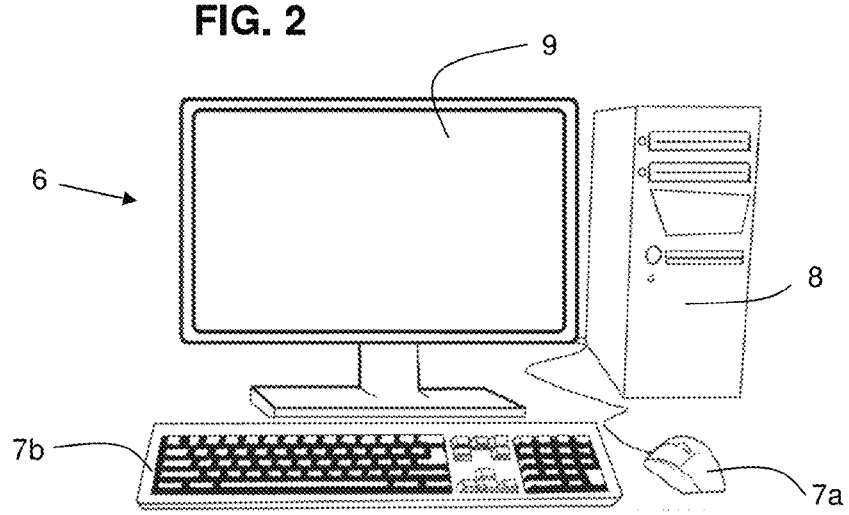
FIG. 2 is a schematic view of the computer system in which the invention is carried out.

FIG. 1 shows schematic view of the process carried out in the invention whereas FIG. 2 is a schematic view of the computer system in which the method is carried out.

The computer system 6 comprises a processing unit 8, a keyboard 7b, a mouse 7a, a display unit 9, and a spreadsheet file for example stored in the memory of the processing unit.

Figure 3:
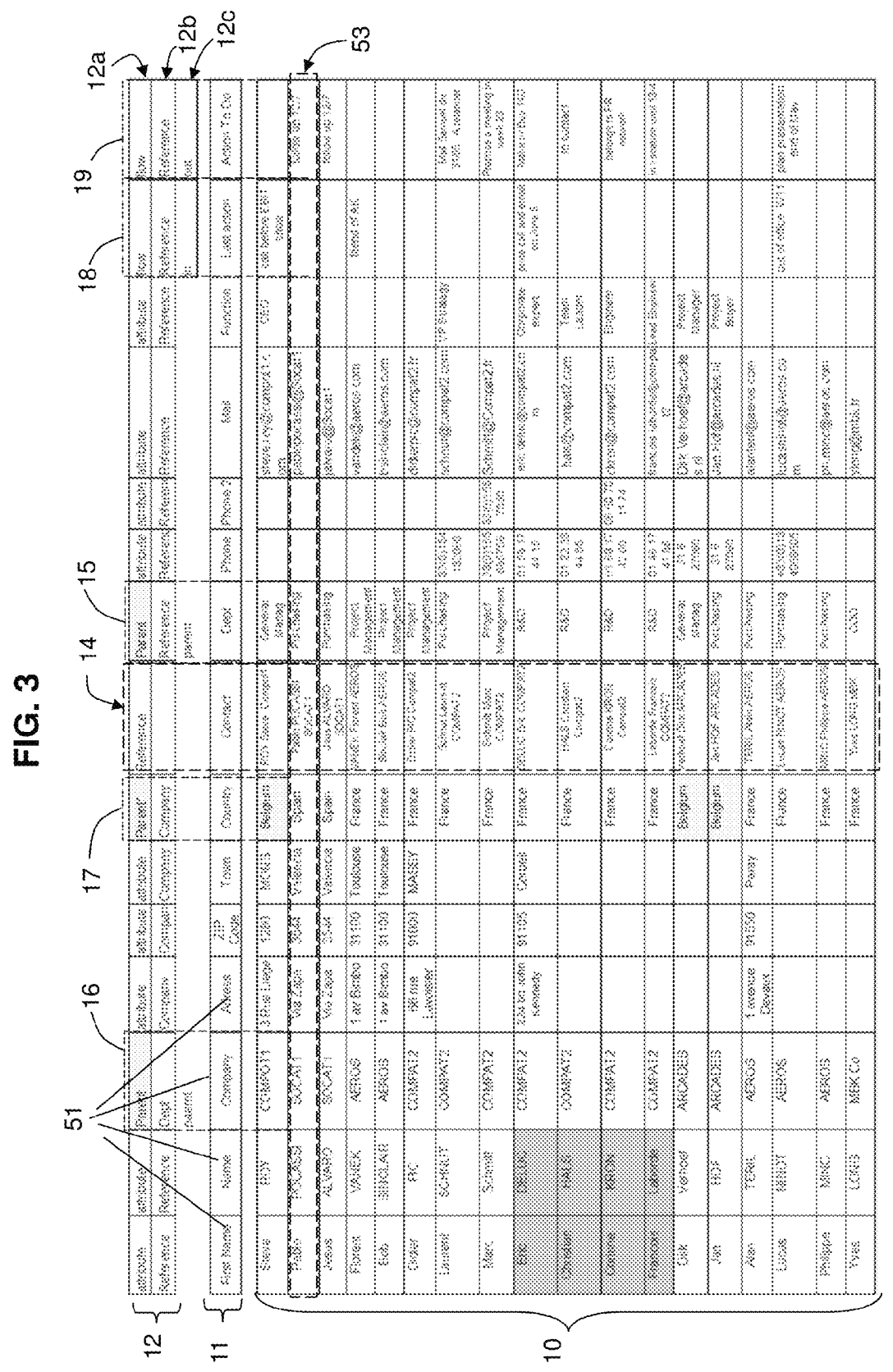
Figure 4B:
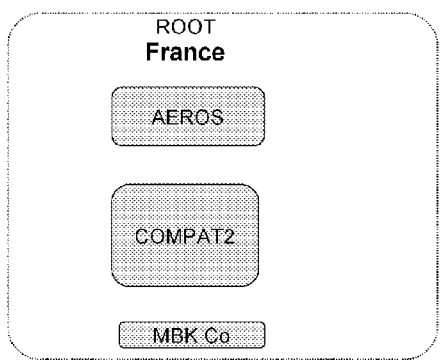
Figure 4A:
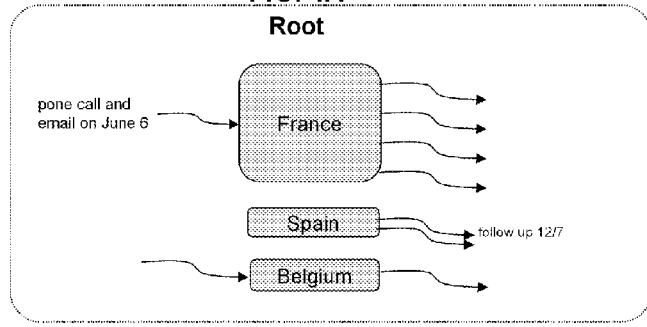
Figure 4C:
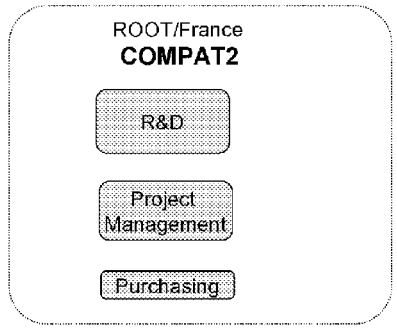
Figure 4D:
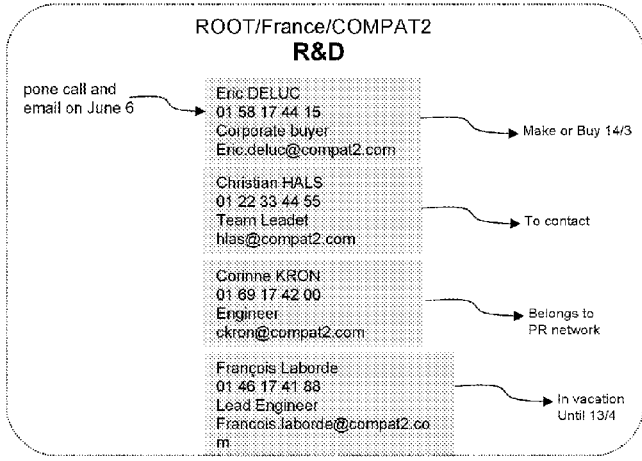
Figure 4F:
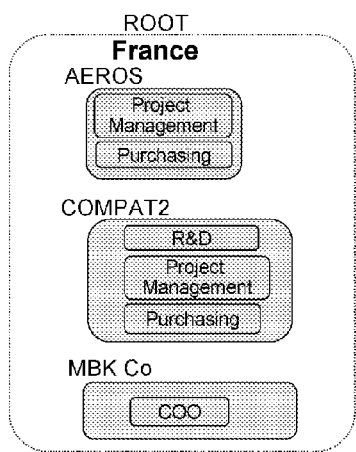
Figure 4E:
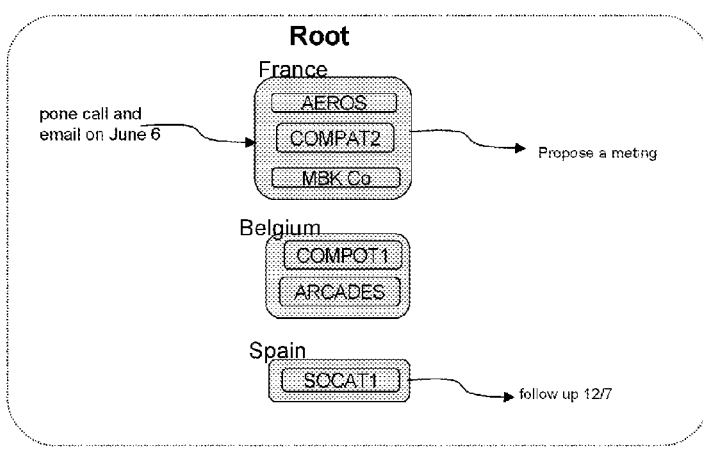
Figure 4G:
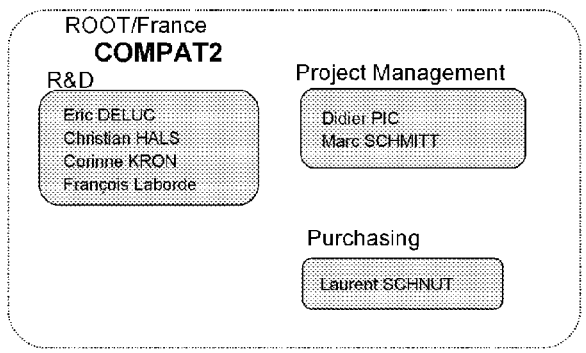
Figure 5:
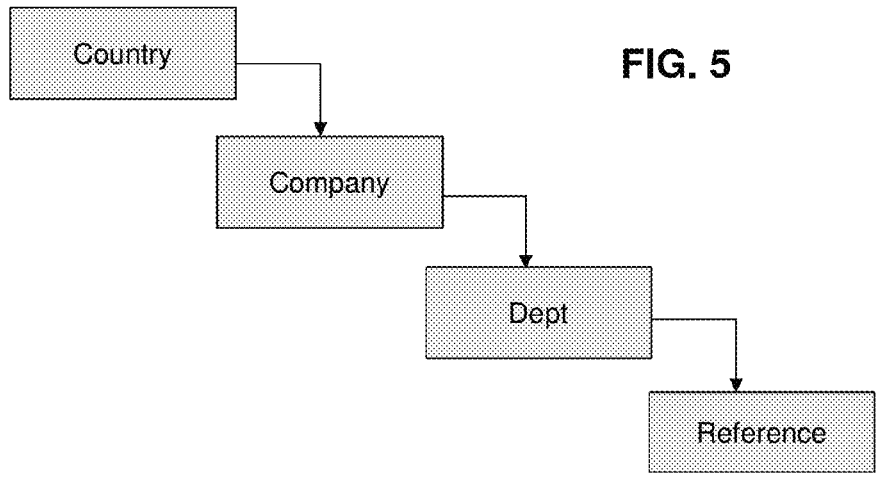
FIG. 5 is an exemplary view of the hierarchical model corresponding to the spreadsheet of FIG. 3.

According to the invention, referring to FIGS. 1-2 and to FIGS. 3-5 as a first example, the spreadsheet file has at least a sheet 1 which includes data. Said sheet 1 exhibits lines and columns, wherein columns represent fields, as well known in the art. There are provided cells at the intersection of line and column. Said spreadsheet file may be for example an Excel™ file, but other similar spreadsheets type are not excluded.

More precisely, said sheet comprises:
- a header portion 11 having at least a designation line with a field designation 51 for each column, as illustrated in FIGS. 3-4,
- a data portion 10, wherein each line comprises a record 53. Each record exhibits a plurality of cells corresponding to the columns.

It should be noted that an additional area 12 shown in FIG. 3, named hereafter 'typing/linking' area 12, is not part of the original sheet, the purpose of this additional area 12 will be explained later.

Referring to the example given in FIG. 3 which shows an example of a Customer Relation Management file ('CRM'), the header portion 11 comprises a single designation line with field designations like 'first name', 'name', 'company', 'address', etc. . . . Each record 53 represents a contact person with several cells (fields) that will be explained below.

It should be noted that it is not excluded that some fields may be located in another sheet of the same spreadsheet, or even in another spreadsheet.

The method operates on said sheet 1 as described above and comprises several steps as explained below.

The first step is: /a/ identifying a single reference field 14; in this step, a field forming the index of the sheet is determined, which is not necessarily the first column. In order to help to determine this field, all the field values in this column must be different, in other words two records have necessarily two different reference field values.

In case the data is spread across more than one sheet, the sheet in which the reference field is identified is named 'main sheet' for the purpose of the present invention.

The second step of the method is: /b/ an allocating step; in this step a field type is allocated to designation fields other than the reference field. In the present example, each field is allocated with a type but some field may not be allocated with a type (see column reference 26 in FIG. 6 for example). Said field type belongs to a set of field type comprising three possible values: attribute, parent, and flow. Returning to the example of FIG. 3, the field 'Phone' is an attribute of the contact person, as well as other fields like 'mail' 'function', which are also allocated with the 'attribute' type. On the other hand, the field 'Dept' (meaning Department) is allocated with the type 'parent' because a contact person belongs to a department of a company. Further, the field 'last action' is allocated with the type 'flow'. The 'flow' type denotes an information similar to a message.

In the exemplified sheet of FIG. 3, the field type corresponding to each field is inserted in an additional line, referenced 12a. This additional line can be referred to as 'field type line' 12a.

The third step of the method is: /c/ defining a link; in this step, for each field, it is defined a link which establishes a link with another field named 'linked field', within said sheet or another sheet, wherein, depending of the considered field type:
- for a field type being attribute, said link is an attribute link and defines properties or features relative to the reference field or to a parent field,
- for a field type being parent/child, said link is an parent/child link and defines a membership relationship, wherein a child field belongs to a parent field,
- for a field type being flow, said link is a flow link and defines a message relative to the reference field; said message may be a input-like message, an output-like message or a neutral-like message.

It should be noted that, according to a preferred manner, steps /b/ and /c/ can be performed simultaneously.

Regarding the 'flow' type, there may be provided a subtype indicating the direction of the message, like 'in', 'out'. This sub-type additional information may be provided in a third line 12c belonging to the typing/linking area 12, as shown in FIG. 3. In this example, a flow-type field 18 named 'Last Action' is allocated with the sub type 'in', whereas a flow-type field 19 named 'Action To Do' is allocated with the sub type 'out'. 'Last Action' may denote the last interaction occurred with the concerned contact person, whereas 'Action To Do' may denote the next action to be performed in relation with this contact person.

FIG. 3 shows an example where a parent/child link is defined between the reference field 14 which is in this case the field named 'contact' and the field named 'Dept' 15 ('Dept' stands for the Department which the contact belongs thereto). Hence the type is 'Parent' and the linked field is 'Reference'.

Another parent/child link is defined between the field 'Dept' 15 and the field 'Company' 16, and a third parent/child link is defined between the field 'Company' 16 and the field 'Country' 17, as also shown graphically on FIG. 5. The type 'Parent\*' (variant of 'Parent') is allocated to a parent at the highest level, which is also called the 'Root' level. A 'Parent\*' type field has no parent.

Figure 3B:
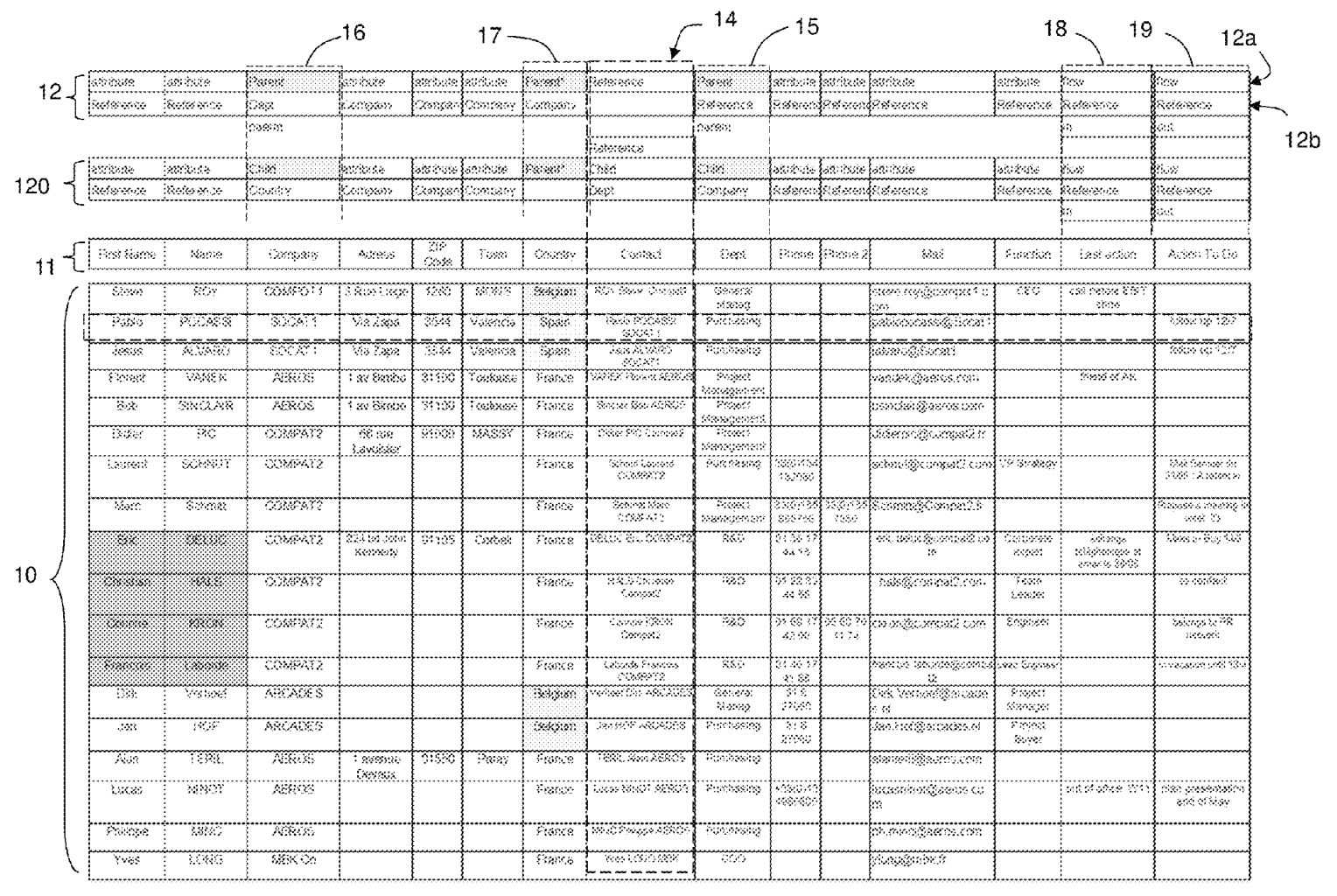

Regarding the parent/child type, there may be provided a sub type which specify 'parent" or 'child', the type 'child' may be used instead of 'parent' in some case, as illustrated in FIG. 3B.

In the exemplified sheet of FIG. 3, the linked field are shown in an additional line referenced 12b. Most attributes fields relate to the field 'reference', but some attributes relate to the 'company' field, like 'ZIP code'. For the 'parent' type, the linked field defines the child linked to this parent. The 'flow' type relates to the reference field 14.

This additional line can be referred to as the 'field link line' 12b. Both additional lines 'field type line' 12a and 'field link line' 12b are referred to as the typing/linking area 12 which is not part of the original sheet.

The fourth step of the method is: /d/ building a hierarchical model 2 representing the parent/child links. In this step, a hierarchical model with at least two hierarchical levels is defined. Said hierarchical model (i.e. meta model) comprises all the fields involved in the parent/child links. In the example of FIG. 3, 'Dept' is the parent of the reference field, 'Company' is the grand-parent of the reference field and 'Country' is the grand-grand-parent of the reference field, as illustrated in FIG. 5 which is a view of the hierarchical model.

In a simple implementation, the hierarchical model 2 can be formed simply by the 'typing/linking' area 12. However, the hierarchical model 2 can be implemented by a data set which is independent of the sheet 1 itself, said data set being an image of what is shown in the 'typing/linking' area 12, as illustrated by arrow 21 in FIG. 1.

The hierarchical model 2 can be shown diagrammatically as illustrated in FIG. 5.

A further step, which is optional, may be: /d2/building a full model 4 comprising all data contained in the data portion 10 of the sheet 1 according to the hierarchical model 2. This full model 4 can be formed as a database set or an xml file or any other known form of retaining structured information. An import operation is performed to transfer the data contained in the data portion 10 of the sheet into the data base full model 4, as illustrated by arrow 41 in FIG. 1. Such a full model 4 exhibits a bijective relationship with the actual sheet content.

A further step of the method is: /e/generating a graphical hierarchical multilevel representation 3 of said sheet content. This can be done by using the hierarchical model 2 together with the sheet data portion, without requiring the step /d2/ of building the full model 4; this simplified method is illustrated by the arrow 31 in FIG. 1.

When using a full model 4, the graphical hierarchical multilevel representation 3 issued in step /e/ is obtained directly from said full model 4, without requiring an access to the sheet 1, as illustrated by arrow 43.

Said graphical hierarchical multilevel representation 3 may comprise at least one view for at least one, preferably each hierarchical level as illustrated in FIGS. 4A-4D.

Advantageously according to the invention, each of said view per hierarchical level shows graphically a parent instance and all children instances linked to said parent instance by a parent/child link, and preferably the attributes of each child.

FIG. 4A shows the Root level which is the highest hierarchical level, the children of Root being the instances of the field 'Country' (identified as 'parent*'), namely France, Spain, Belgium.

FIG. 4B shows a view of the parent 'France' where each of the children of 'France' are shown as rounded boxes. The children of 'France' are instances of the field 'Company' according to the hierarchical model, namely 'AEROS', 'COMPAT2' and 'MBK Co' in the illustrated example.

FIG. 4C shows a view of the parent 'COMPAT2' where each of the children of 'COMPAT2' are shown as rounded boxes. The children of 'COMPAT2' are instances of the field 'Dept' according to the hierarchical model, namely 'R&D', 'Project Management' and 'Purchasing' in the illustrated example. The children of 'COMPAT2' here are the grandchildren of 'France'.

FIG. 4D shows a view of the parent 'R&D' where each of the children of 'R&D' are shown as rounded boxes. The children of 'R&D' are instances of the field 'Contact' (i.e. the 'reference' field) according to the hierarchical model. The children of 'R&D', namely the 'Contact' instances are here the grandchildren of 'COMPAT2', and are the grand-grand-children of 'France', namely contacts 'DELUC Eric COMPAT2', 'HALS Christian Compat2', Corinne KRON Compat2', 'Laborde Francois COMPAT2'.

According to a further feature of the invention, each view of the graphical hierarchical multilevel representation 3 may optionally show the attributes of each child, as illustrated in FIG. 4D, this option is selectively chosen by the user who can select or unselect any kind of additional display of this type through a known user interaction with mouse and/or keyboard.

According to a further feature of the invention, each view of the graphical hierarchical multilevel representation 3 may optionally show the content of flow fields linked to all children linked to said parent instance by a parent/child link, as illustrated in FIGS. 4A and 4D. Again, this option can be selectively chosen by the user who can select or unselect any kind of additional display of this type through a known user interaction with mouse and/or keyboard According to a further feature of the invention, there are provided views with two or more hierarchical levels in a single view, as depicted in FIG. 4E-4G. A simple user operation allows to 'unfold' a displayed box, thereby showing the inferior hierarchical level within the box. An opposite 'Fold' operation is also available.

FIG. 4E shows the Root level, the countries instances and within each country the instances of 'Company' that belongs to this country.

FIG. 4F shows one 'country' level (here 'France'), the 'Company' instances of said country (namely AEROS, COMPAT2 and MBK Co) and within each Company the instances of 'Dept' that belongs to this 'Company'.

FIG. 4G shows one 'Company' level (here 'COMPAT2'), the 'Dept' instances of said 'Company' and within each 'Dept' (namely 'R&D', 'Purchasing' and 'Project Management'), the instances of 'contact' that belongs to this Dept.

Here again, the attributes and flows can be selectively displayed or not displayed.

According to a further aspect of the invention, the sizes of the boxes depend on the number of instances within the box. This can be also implemented on the size of the arrows representing the flows. Therefore, there is provided a sizing feature in which each graphical object showing a parent has a size, and said size is in relation with the number of children of said parent.

It should be noted that there may be several possibilities to define the model 2, as exemplified in FIG. 3B, wherein the parent/child links are formed as child links.

Figure 6:
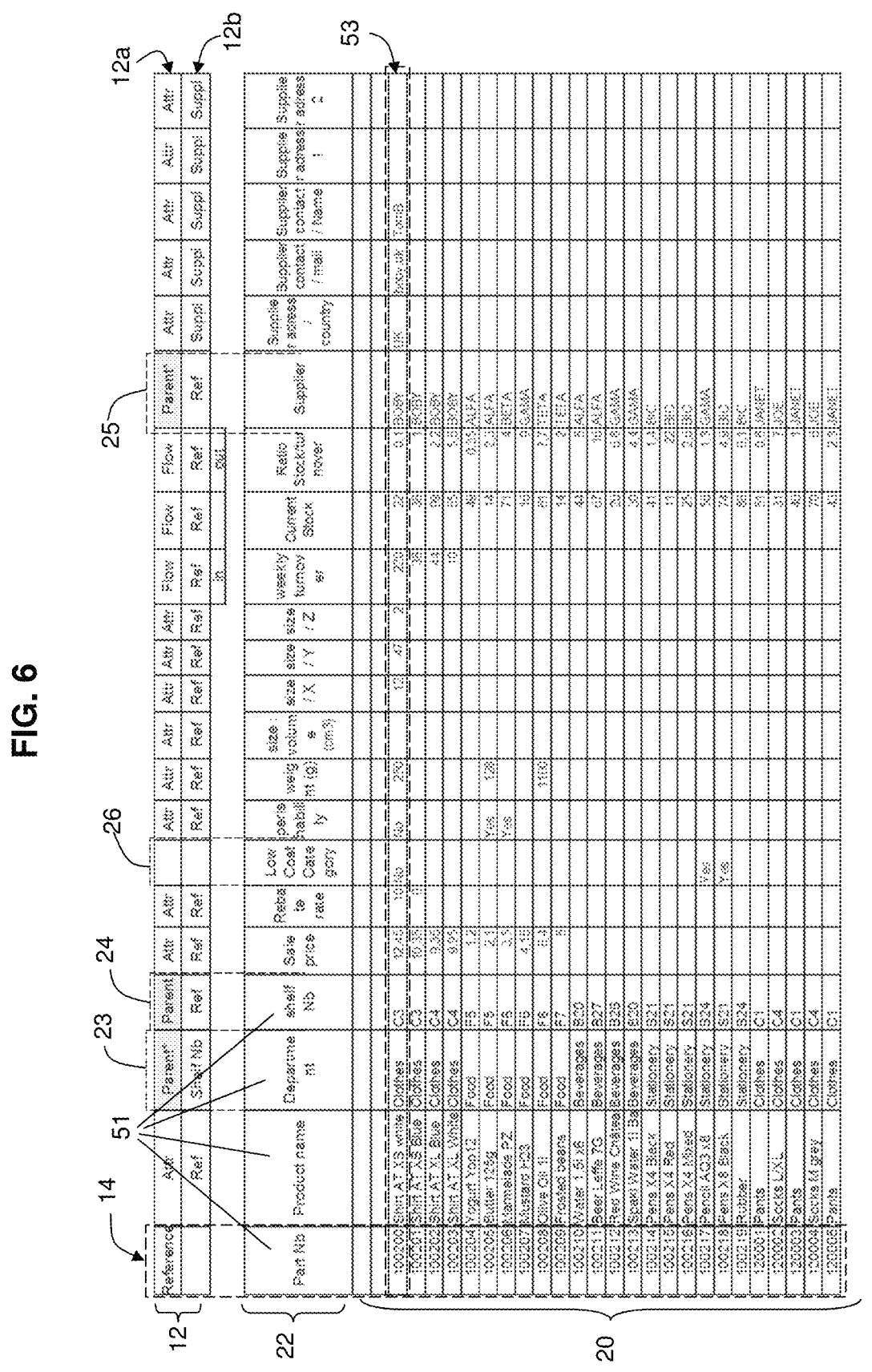

A second example is illustrated below in reference to FIGS. 6-9. The illustrated sheet in FIG. 6 shows a Products Management file, used for example in department stores or in shops, not excluding on-line shops.

Said sheet 1 has lines and columns as well known, each of said columns represent a field.

The names of the fields are comprised in a header portion 22, which in this case is a single line named 'designation line', but the header portion could be spread over more than one line. A field designation 51 is provided for each column, for instance 'Sale Price', 'Weight', 'Supplier name', 'Size:volume', 'Product Name', etc. . . . .

A data portion 20 contains a collection of lines (also called 'record') which can be very large, for example more than ten thousands lines. Each line represents an article or product which is on sale.

Each record 53 represents a product on sale with several information that are attached to this product, for example in cells corresponding to the fields 'Sale Price', 'Weight', 'Supplier name', 'Size: volume', 'Product Name', etc. . . .

Some fields contain attributes that characterize the properties of the product, they are therefore allocated with the type 'attribute' ('Attr' in short) in step /b/ of the method.

The product is identified by a part number or product number, which is the first column in this case. Therefore, the field chosen to be the reference field 14 is the field having 'Part Nb' as designation. This choice takes place in the step /a/ of the method as explained above regarding the first example.

Some fields contain more dynamic data like 'weekly turnover', 'Stock' for instance, they are allocated with the type 'flow' in the illustrated example.

Again, the area noted 12 is not part of the original sheet. Line 12a is defined during the type allocating in step /b/, in which one of the following type is allocated to each field: attribute, parent/child, flow.

It is apparent from FIG. 6 that a field may not be allocated with a type, for instance column referenced 26 with the field 'Low Cost Category'; in such a case the data included in this field will not be 'imported' by the method and therefore will not be part of the full model.

Line 12b is defined during the link determination in step /c/. In this step, depending on the field type, each field with a type is linked to a linked field, as already explained for the first example.

More particularly, in this second example, 'Shelf Nb' ref. 24 is parent of 'Part Nb' (which is the reference field ref. 14) so the linked field in line 12b of column 24 is equal to 'Reference' ('Ref' in short). Further, the field 'Department' ref. 23 is parent of 'Shelf Nb' 24, so the linked field in line 12b of column 23 is equal to 'Shelf Nb'. The field 'Department' is the highest parent so it is at Root level, hence the type is 'Parent*'.

'Supplier' (column 25) is also parent of 'Part Nb' and indicates which supplier supplies each product. 'Supplier' is thus allocated with 'Parent' and is kinked to the 'Part Nb' field: in this case there is only two levels in this branch of the model.

Figure 9:
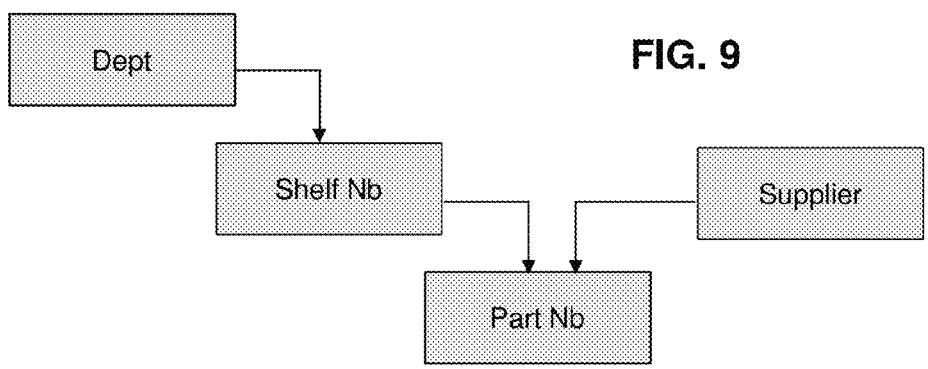
FIG. 9 is an exemplary view of the hierarchical model corresponding to the spreadsheet of FIG. 6.
Figure 10:
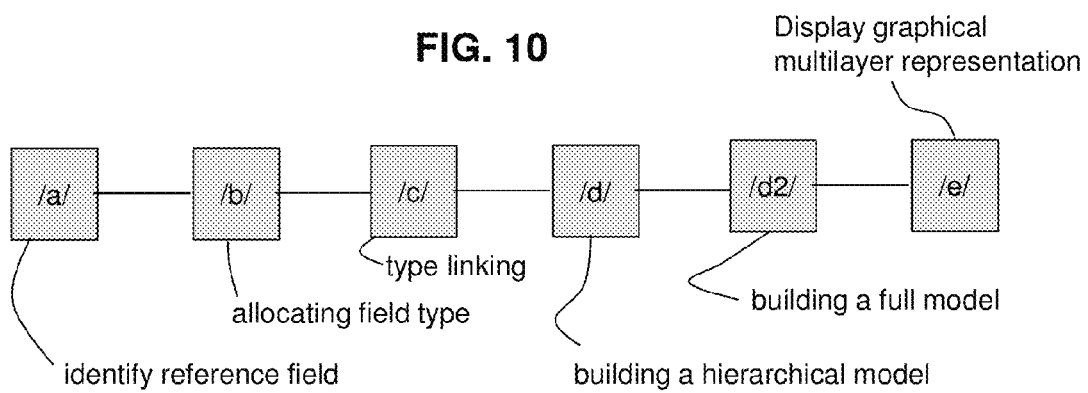
FIG. 10 illustrates the method.

The resulting model is depicted on FIG. 9, showing that 'Part Nb' has two parents i.e. 'Shelf Nb' and 'Supplier'. 'Shelf Nb' has as a parent: 'Department'.

An alternative to this parent/child hierarchy definition would be to allocate the type 'child' to the 'Reference' field 14, with the linked field 'Shelf Nb', then to allocate the type 'child' to 'Shelf Nb' with the linked field 'Department'.

This resulting model (see FIG. 9) is very simple in this second example, but the present invention encompasses all type of models, with the possibility to have more than one child field for each parent (when using the 'child' type as explained above), and the possibility to handle much more complex models thanks to the automated process carried out on the basis on such a model.

Figure 7B:
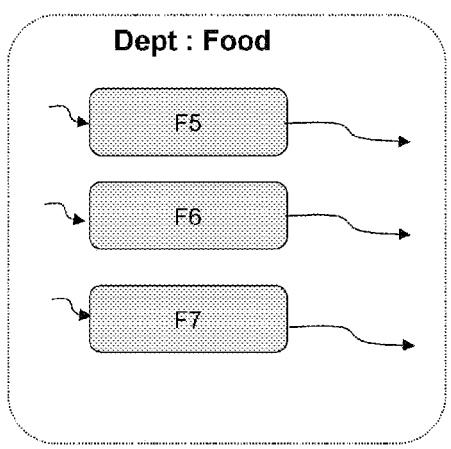
FIGS. 7A-7C are exemplary views of a graphical representation corresponding to the spreadsheet of FIG. 6, FIGS. 8A-8B are exemplary views of a graphical representation corresponding to the spreadsheet of FIG. 6.
Figure 7A:
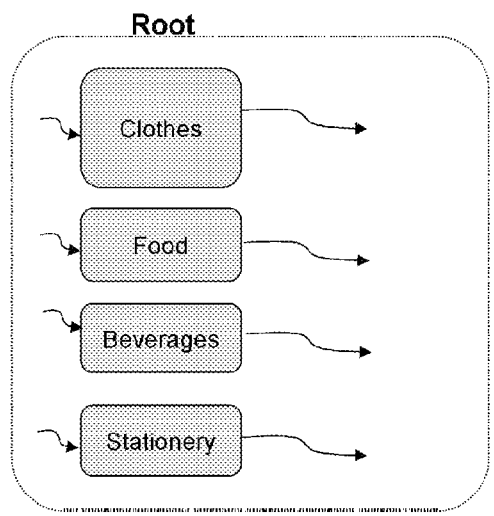

As illustrated in FIG. 7A, which shows a example of view generated by the computer system, for example from the full model 4, the Root level (i.e. Store) comprises four instances of 'Department' i.e. 'Clothes', 'Food', 'Beverages', 'Stationery'.

The size of the box may depend on the number of instances belonging to each box. There may be provided arrows that denote the flows in (here for instance 'weekly turnover') and/or the flows out (here for instance 'Ratio Stock/Turnover, or 'Stock'). Of course the display of such data can be selected or deselected, depending on choices made by the user. Further the display of some attributes related to each field may also be selected to be displayed.

FIG. 7B shows another example of a view generated by the computer system, one level below. The level of 'Department' Food comprises three instances of Shelf Nb: F5, F6, F7.

Figure 7C:
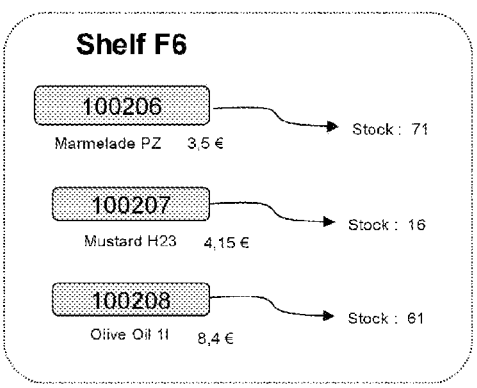

FIG. 7C shows another example of a view generated by the computer system, again one level below. The level of 'Shelf Nb' F6 comprises three instances of Product Nb: 100206, 100207,100208. Some attributes related to the products on display may also be selected to be displayed, i.e. here the 'Product Name', 'Sale Price' and the 'Current Stock'.

Figure 8B:
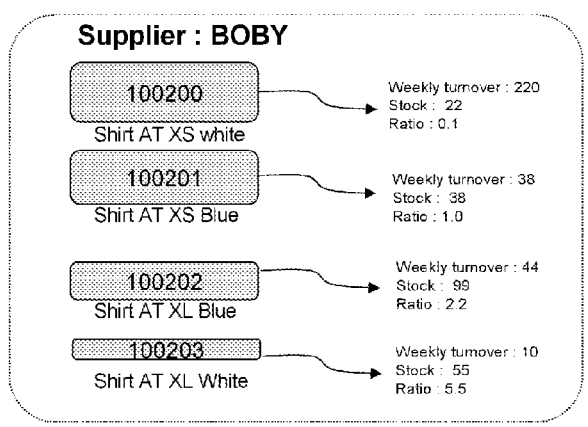
Figure 8A:
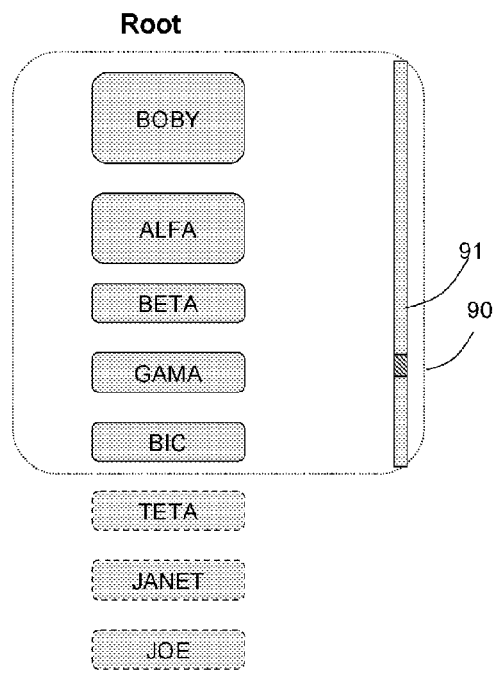

FIG. 8A shows another example of a view generated by the computer system, at the highest level, showing another branch of the model. The Root level (i.e. Store) comprises eight instances of 'Supplier' i.e. 'BOBY', 'ALFA', 'BETA', 'GAMA', 'BIC', 'TETA', 'JANET' and 'JOE'. In the present case where the list is larger than the current size of the window 90, a side slider 91 may be provided as known in the art.

FIG. 8B shows another example of a view generated by the computer system, one level below. The level of 'Supplier' 'BOBY' comprises four Product Nb: 100200, 100201, 100202, and 100203. The attribute 'Product Name' is displayed underneath; also are displayed for each Product Nb: the 'weekly turnover', the 'Current Stock' and the 'Ratio Stock/Turnover'.

In FIG. 8B, the sizes of the boxes may be made dependent on the field weekly turnover upon selection by user.

It should be understood that the display selections and options are chosen by the user to reveal the most relevant aspects of the information contained in the sheet 1. The user may also select predefined parameterization to avoid selecting the preferred options each time he enters the computer program operating the method.

As already mentioned, the graphical attributes of the boxes or arrows can depend on field values, attributes, flows values, etc. Not only the size can be used; for example, items for which the ratio stock/turnover is higher than a predefined value may be shown in red color. Also the borders of the boxes or the background of the boxes can have various colors representative of a particular status.

Changes/Updates/Reinjection

From the full model 4 (or from the simpler model based on the sheet and the hierarchical model 2), a change can be introduced, either in the data content or in the child/parent link, thanks to a mouse/keyboard user operation performed on the views of the graphical hierarchical multilevel representation 3.

For example, referring to the first example (FIGS. 3-5), it is possible to change the 'Phone' of a contact. This is also possible to change the mail or any other attribute of one instance on 'Contact'.

It is also possible to transfer a Contact from one 'Dept' to another 'Dept', just by a usual 'Drag and Drop' action.

Another example is the change of address of a 'Company' or at least a Department of the 'Company'. Once done in the relevant graphical box, it will affect all the instances of the Company or Dept address once re-injected in the sheet 1 as explained below.

The change can also concern the hierarchical model 2 itself that can be updated: for example adding an intermediate level or cancelling one level by aggregating two levels.

Changes are re-injected from the full model 4 into the sheet 1 (or into a duplicate of sheet 1) using the aforementioned bijective relationship shown as arrow 41 on FIG. 1. Therefore, it is highly more beneficial to do the desired changes in the graphical view on the full model than directly on the sheet 1.

The reinjection of changes are performed automatically by the computer system, the user may check the result in the output duplicate sheet. If everything is in order, the duplicate sheet is made to replace the original sheet 1, omitting the typing/linking area. This resulting sheet, under the spreadsheet format, is ready to be used as the original sheet by any type of software suite.

It will be appreciated that some high level changes, like address change of a 'Company', will be spread across all the uses of 'Company address' in the sheet(s) of the spreadsheet, without risk of mistakes.

Therefore, thanks to the computer system 6 carrying out the method, a user can easily, as explained above, display and update a large amount of data with the help of the afore mentioned graphical hierarchical multilevel representation 3. Said data is in most cases representative of objects in the real world like people in the first example or products on sale in the second example. Likewise, the sheet may contain more than a thousand, ten thousands or much more records like in the case of a department store.

It is indeed unrealistic to implement the method explained above by hand or by paper and pen. Data contained in the sheet 1, representative of real objects, can be updated and/or transformed thanks to the change/reinjection method explained above, without having recourse to direct operations on the sheet 1.

The invention claimed is:

1. A method to be carried out in a computer system that includes a processing unit, a keyboard, a mouse, a display unit and a data storage device, the data storage device having stored thereon a spreadsheet file having at least a sheet with lines and columns, said columns representing fields, said sheet having sheet content with a header portion having at least a designation line with a field designation for each column, and a data portion, wherein each line comprises a record, the method comprising:
   /a/ identifying a single reference field;
   /b/ an allocating step in which a field type is allocated to fields other than the reference field, said field type belonging to a set of field types comprising attribute, parent/child, and flow;
   /c/ defining a link, for each field with an allocated field type, which establishes said link with another linked field, within said sheet or another sheet, wherein:
      for a field type being attribute, said link is an attribute link and defines properties relative to the reference field or to a parent field;
      for a field type being parent/child, said link is a parent/child link and defines a membership relationship, wherein a child field belongs a parent field; and
      for a field type being flow, said link is a flow link and defines a message relative to the reference field;
   /d/ building a hierarchical model representing the parent/child links, defining at least two hierarchical levels, said model comprising all the fields involved in the parent/child links; and
   /e/ generating a graphical hierarchical multilevel representation of said sheet content, with at least one graphical view showing one or more hierarchical level and displaying said representation with graphical objects on the display unit.

2. The method as claimed in claim 1, further comprising:
   /d2/ building a full model comprising targeted data contained in the data portion of the sheet according to the hierarchical model, and wherein the graphical hierarchical multilevel representation is generated from said full model.

3. The method as claimed in claim 1, wherein said graphical hierarchical multilevel representation comprises at least one view per hierarchical level which shows graphically a parent instance and any children linked to said parent instance by the parent/child link(s), and preferably the attributes of each child.

4. The method as claimed in claim 3, wherein said at least one view per hierarchical level further shows graphically attribute fields linked to all children linked to said parent instance by said parent/child link, and/or flow fields linked to all children linked to said parent instance by said parent/child link.

5. The method as claimed in claim 1, wherein said graphical hierarchical multilevel representation shows two or more hierarchical levels in a single view.

6. The method as claimed in claim 3, wherein said graphical hierarchical multilevel representation comprises a sizing feature in which each graphical object showing a parent instance has a size, and said size is in relation with a number of children of said parent instance.

7. The method as claimed in claim 1, wherein said graphical hierarchical multilevel representation further comprises a synthetic view of the hierarchical model itself, comprising boxes representing respectively each field involved in said parent/child links, and arrows linking said boxes.

8. The method as claimed in claim 1, wherein in the allocating step /b/, the allocation of the field type is performed via a user interaction, preferably upon a proposal made by the computer system.

9. The method as claimed in claim 1, wherein changes can be made in said graphical hierarchical multilevel representation through a user interaction with a mouse or keyboard action, and wherein said changes are automatically re-injected into the sheet thanks to the hierarchical model.

10. The method as claimed in claim 1, wherein the hierarchical model can be changed through a user interaction directly performed on said graphical hierarchical multilevel representation, and wherein said change is automatically re-injected into the sheet.

11. The method as claimed in claim 1, wherein the spreadsheet file has two or more sheets and wherein the method operates on two or more of said sheets, wherein the single reference field is identified in a main sheet and wherein one or more fields are located within another sheet.

12. The method as claimed in claim 1, wherein the parent/child type is allocated with a subtype chosen between parent or child.

13. The method as claimed in claim 1, wherein the flow type is allocated with a subtype chosen between 'in' or 'out'.

14. A Computer program stored in a non-transitory computer-readable memory, comprising instructions that, upon execution by a computer processing unit, causes the processing unit to perform the method as claimed in claim 1.

* * * * *